United States Patent [19]

Phillips, II

[11] Patent Number: 5,066,446
[45] Date of Patent: Nov. 19, 1991

[54] METHOD FOR MAKING A BLIND FASTENER

[75] Inventor: Ronald W. Phillips, II, Mogadore, Ohio

[73] Assignee: The B. F. Goodrich Company, Akron, Ohio

[21] Appl. No.: 564,216

[22] Filed: Aug. 8, 1990

Related U.S. Application Data

[62] Division of Ser. No. 435,919, Nov. 13, 1989, Pat. No. 4,984,946.

[51] Int. Cl.$^5$ .................. B29C 45/14; F16B 13/06
[52] U.S. Cl. .................. 264/242; 164/137; 264/250; 264/254
[58] Field of Search .......... 411/34, 38, 43, 55; 264/242, 254, 130, 250; 164/94, 111, 137

[56] References Cited

U.S. PATENT DOCUMENTS

| | | | |
|---|---|---|---|
| 2,409,352 | 10/1946 | Gill | 411/38 |
| 2,763,314 | 9/1956 | Gill | 151/41.72 |
| 3,030,705 | 4/1962 | Gill | 29/526 |
| 4,007,659 | 2/1977 | Stencel | 85/70 |
| 4,238,446 | 12/1980 | Tanaka | 264/250 |
| 4,639,175 | 1/1987 | Wollar | 411/43 |
| 4,859,128 | 8/1989 | Brecz et al. | 411/43 |
| 4,875,815 | 10/1989 | Phillips, II | 411/183 |

FOREIGN PATENT DOCUMENTS 2093757 9/1982 United Kingdom ............ 264/250

*Primary Examiner*—Jan H. Silbaugh
*Assistant Examiner*—Brian J. Eastley
*Attorney, Agent, or Firm*—Joseph Januszkiewicz

[57] ABSTRACT

A method for making a blind fastener that has a flanged outer sleeve and a flanged inner sleeve that are secured together, wherein the outer sleeve has a socket that receives a lug from the inner sleeve to provide joint axial movement and wherein the outer sleeve has a plurality of slits that receive at least one radial projection from the inner sleeve to prevent rotation between sleeves. The inner sleeve has a thinner upper portion and a thicker lower portion with a score line therebetween to facilitate the separation of this portion. The inner sleeve has a central threaded bore to receive a threaded bolt for fastening purposes and to upset the outer sleeve relative to the flanged portion thereof to secure such fastener to a thin workpiece.

9 Claims, 5 Drawing Sheets

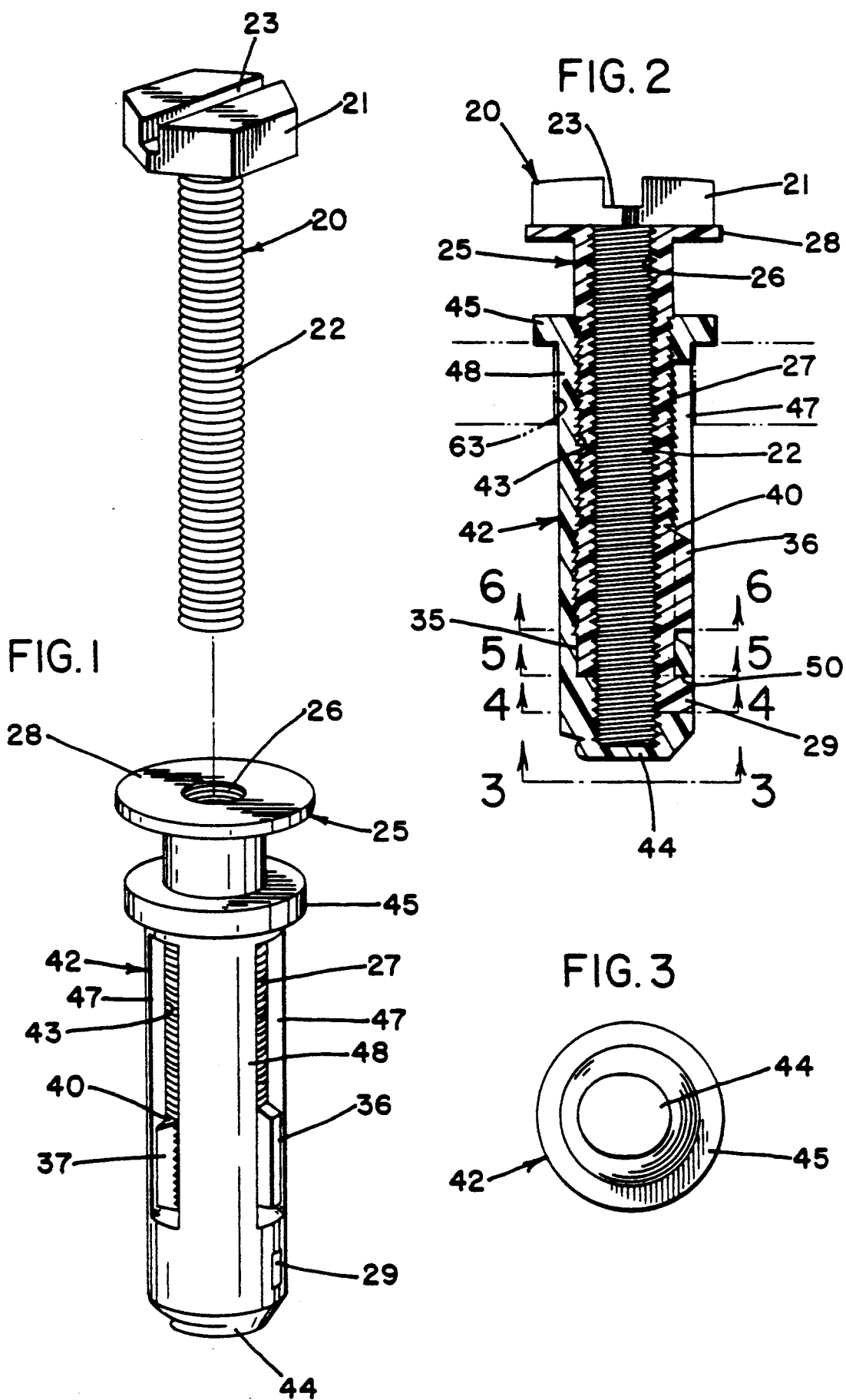

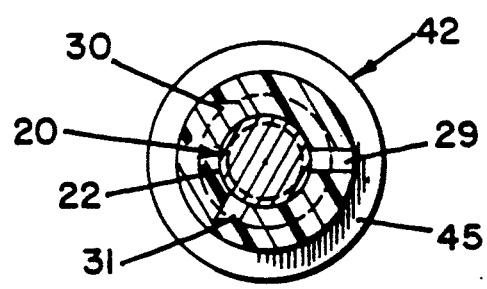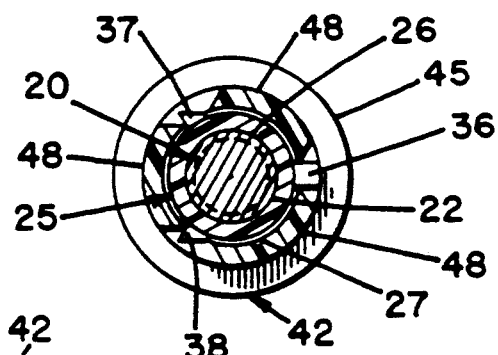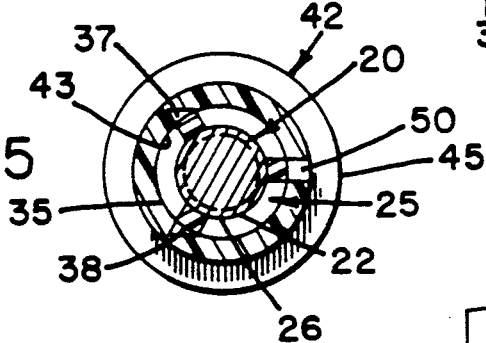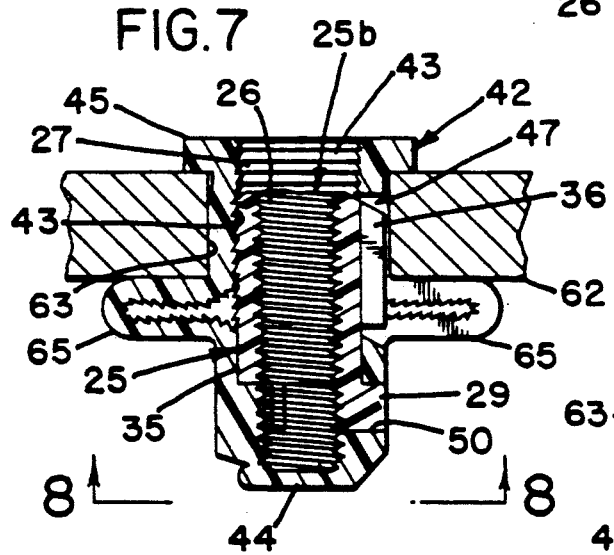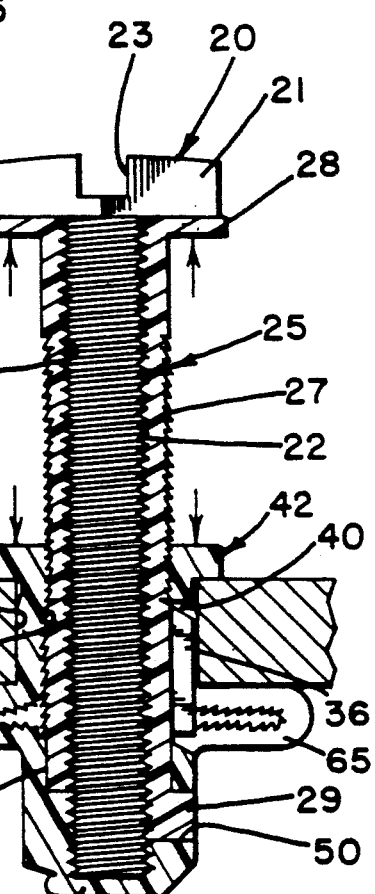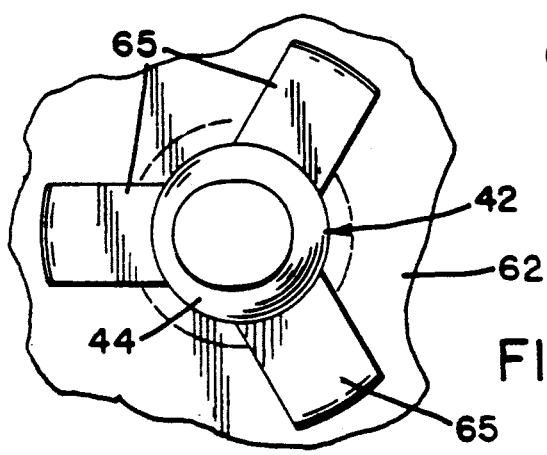

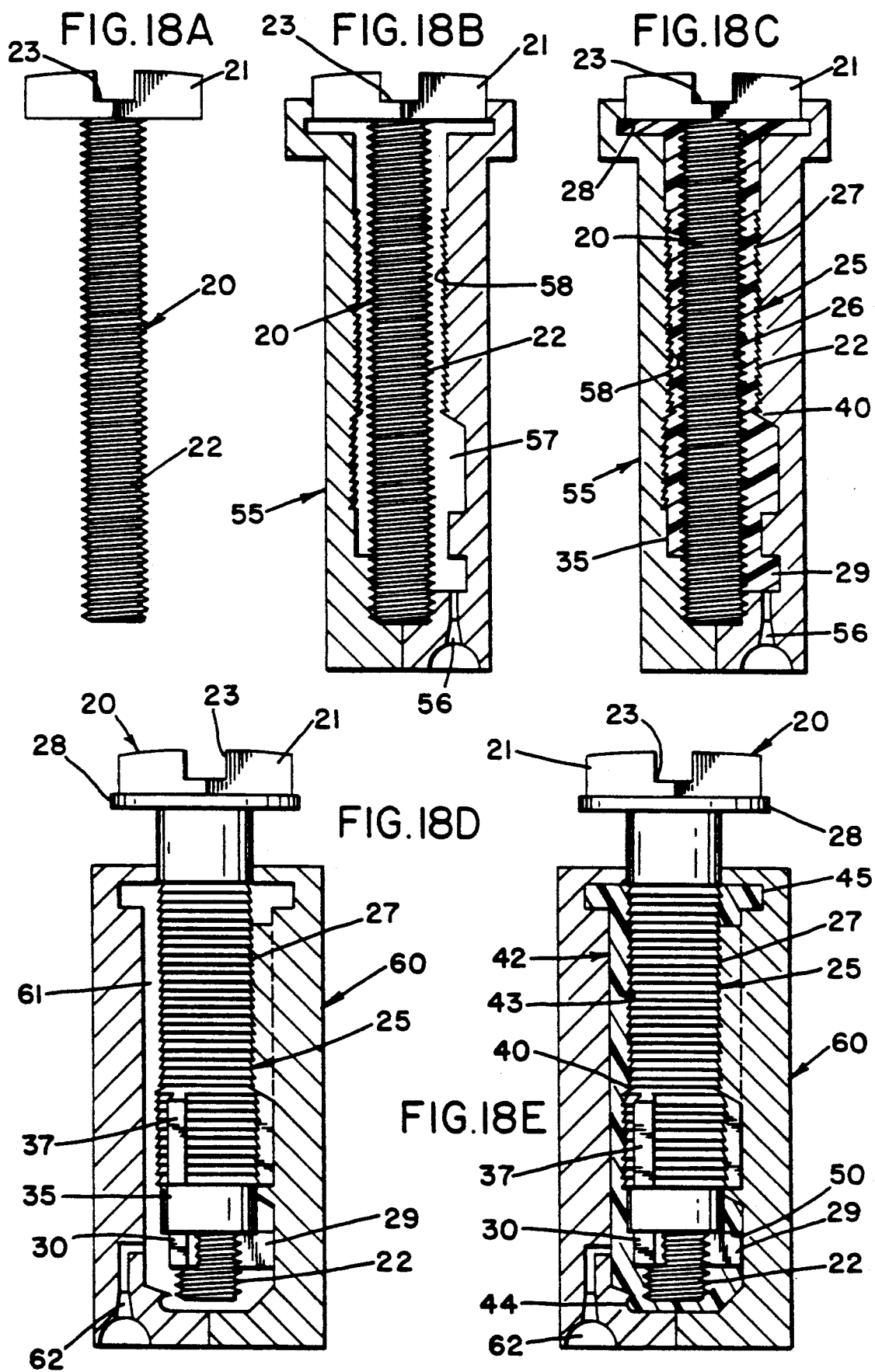

METHOD FOR MAKING A BLIND FASTENER

This is a division of application Ser. No. 07/435,919 filed Nov. 13, 1989 now U.S. Pat. No. 4,984,946.

BACKGROUND OF THE INVENTION

This invention relates to blind fasteners of the type that can be installed entirely from one side of a structure and more particularly to a new and improved blind fastener that is inexpensive to manufacture such as one that can be made entirely from plastic materials.

The blind fasteners heretofore used consisted of various designs wherein the fastener had a tubular or cylindrical body with a head on an upper portion that was slotted and a lower body portion that was threaded. In the process of securing such fasteners to the plate structure, the upper slotted body portion would be deformed or folded outwardly thereby presenting a flanged and deformed portion which would secure the fastener to the plate structure with the head on one side and the deformed flanged portion on the other side.

Another requirement of such blind fasteners is that they be easy to manufacture and operate in a facile manner. The fastener of the present invention is particularly easy to manufacture because it can be made from a plastic material as in an extrusion or molding process. Further, the application of the blind fastener to a workpiece is accomplished in a facile manner yet insuring a firm attachment to such workpiece.

SUMMARY OF THE INVENTION

A blind fastener and the method of making such fastener for attachment to a thin plate or workpiece wherein an outer sleeve has a flanged head for seating on the workpiece and has a cylindrical body portion extending through a bore in the workpiece for deformation such that its bulging will captively secure the fastener to the workpiece. The outer sleeve has longitudinally extending slits and sockets. An inner sleeve is located within the outer sleeve and is attached thereto by a radial lug extending into the socket and projections extending into the slits of the outer sleeve. The inner sleeve has a central bore to receive a bolt for upsetting and for attaching another object to the fastener and the workpiece.

BRIEF DESCRIPTION OF THE DRAWINGS

FIG. 1 is an exploded perspective view of a blind fastener showing the draw bolt removed;

FIG. 2 is a cross sectional view of the blind fastener showing the bolt, inner sleeve and outer sleeve;

FIG. 3 is an end view taken on line 3—3 of FIG. 2 showing the cap end of the outer sleeve;

FIG. 4 is a cross-sectional view taken on line 4—4 of FIG. 2 showing the end locking projections on the inner sleeve integral or locking the outer sleeve and with the larger projection extending to the outer surface of the outer sleeve;

FIG. 5 is a cross sectional view taken on line 5—5 of FIG. 2 showing the projections on the inner sleeve engaging recesses in the outer sleeve;

FIG. 6 is a cross sectional view taken on line 5—5 of FIG. 2 showing the projections of the inner sleeve extending into slots or slits on the outer sleeve with the serrations on the inner and outer sleeve in locking engagement with the ribs between the slots of the outer sleeve;

FIG. 7 is a view similar to FIG. 2 showing the fastener installed through a blind borehole, with the ribs of the outer sleeve expanded to engage the blind wall surface of the workpiece and the serrations of the inner and outer sleeves in a locking relationship, preventing the fastener from returning to it's extended position shown in FIG. 2;

FIG. 8 is an end view taken on line 8—8 of FIG. 7 showing the ribs expanded on the outer sleeve and engaging the blind wall surface of the workpiece;

FIG. 9 is a cross sectional view of the blind fastener being installed on a workpiece with the bolt and inner sleeve pulled from the fastener and with the outer sleeve captively secured to the workpiece;

FIG. 18A is a side elevational view of the bolt for use with the fastener;

FIG. 18B is a cross sectional view of the mold receiving the bolt for molding the inner sleeve thereto;

FIG. 18C is a cross sectional view of the mold, the cast inner sleeve in integral relationship with the bolt;

FIG. 18D is a side elevational view of the cast inner sleeve and bolt in a mold for casting the outer sleeve; and FIG. 18E is a cross sectional view of the mold and cast outer sleeve in integral relationship with the inner sleeve and bolt prior to removal of the mold to form the blind fastener.

DETAILED DESCRIPTION

Figure 10:
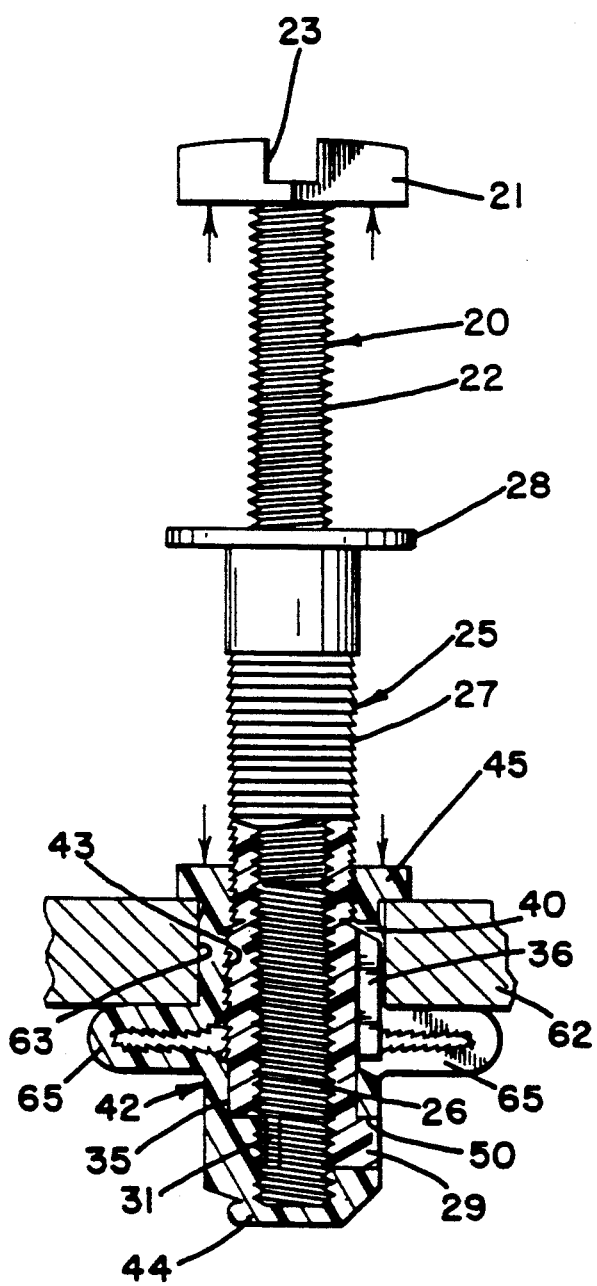
FIGS. 10 and 11 are views similar to FIG. 9 showing the sequence of completing the assembling of the fastener to the workpiece.

Referring to the drawings wherein like reference numerals designate like or corresponding parts throughout the several views, there is shown in FIG. 1 a bolt 20 with an upper flanged head 21 and a depending, longitudinally extending threaded cylindrical portion of shank 22. Flanged head 21 has a slot 23 for selectively rotating such bolt 20.

Figure 11:
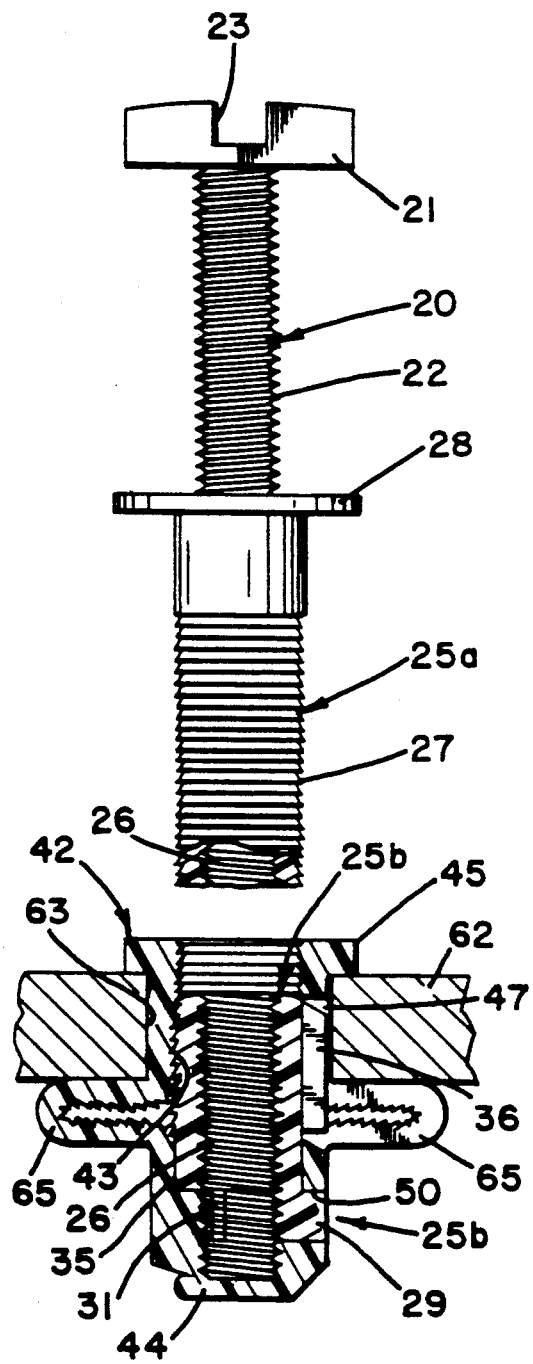
Figure 12:
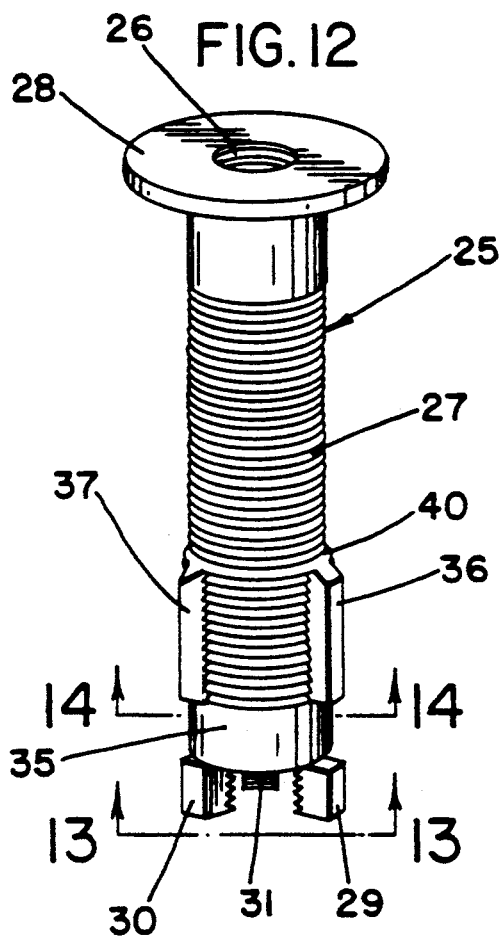
FIG. 12 is a detached perspective view of the inner sleeve, showing the flange, serrations, with projections and locking lugs.
Figure 13:
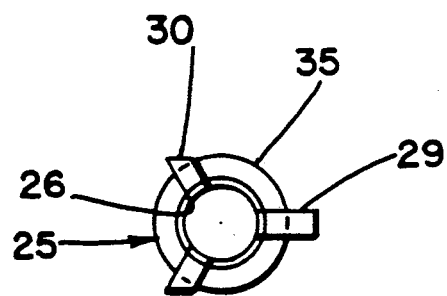
FIG. 13 is an end view of the inner sleeve taken on line 13—13 of FIG. 12, showing the locking lugs.
Figure 14:
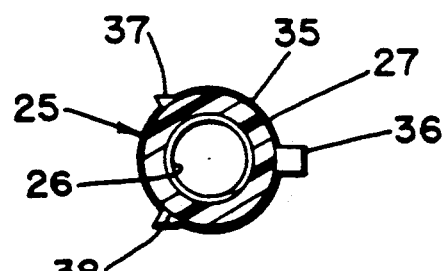
FIG. 14 is a sectional view of the inner sleeve taken on line 14—14 of FIG. 12, showing the projections and the enlarged end serrations between the projections.
Figure 15:
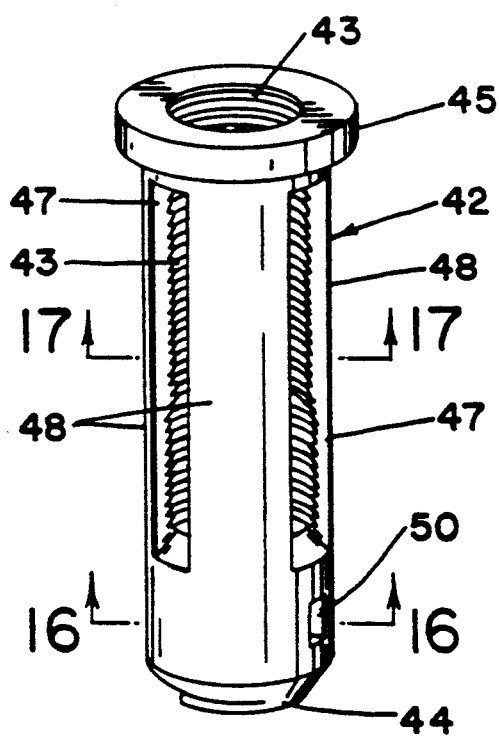
FIG. 15 is a detached perspective view of the outer sleeve, showing the mounting flange, the serrated bore, slots, expanding ribs, and socket that retains the locking lug of the inner sleeve and the capped end.

Bolt 20 is threadedly received by an inner sleeve 25 having a central longitudinally extending threaded bore 26, an outer serrated surface 27, and a flange 28. The lower end portion of inner sleeve 25 has a plurality of circumferentially spaced depending projections, lugs or locking lugs 29-30-31. Lug 29 is a locking projection and is substantially rectangular in cross section in plan view as depicted by FIGS. 4 and 12 with lugs 30 and 31 having a sharp projecting edge or sharp locking projection profile for a purpose to be described. The immediate surface above the lower end portion of inner sleeve 25 has a smooth outer cylindrical surface 35. Above cylindrical surface 35 are a plurality of projections 36-37-38. Projection 36 is rectangular in cross section in plan view while projections 37 and 38 are triangular in cross section in plan view. The cross sectional wall thickness of inner sleeve 25 is consistent in thickness from flange 28 to the juncture with the projections 36-37-38 and thence the cross-sectional wall thickness of inner sleeve 25 increases in thickness. The juncture of these two thicknesses, as clearly seen in FIGS. 9 and 10, has a scoring, incision or indentation cut designated 40 thereat to facilitate the separation of the upper inner sleeve portion from the lower inner sleeve portion which portions are designated 25a and 25b only in FIG. 11 to emphasize that the inner sleeve 25 will fractionalize or break up into two sections upon application of a force as to be described.

Figure 16:
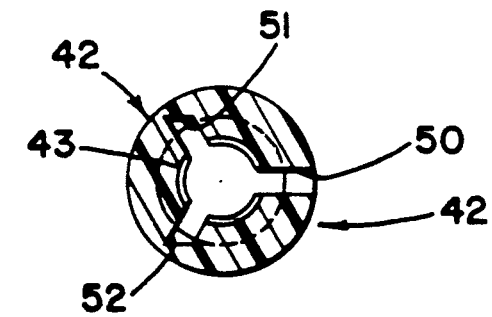
FIG. 16 is a cross sectional view of the outer sleeve taken on line 16—16 of FIG. 15, showing the socket that retains the locking lugs on the inner sleeve.
Figure 17:
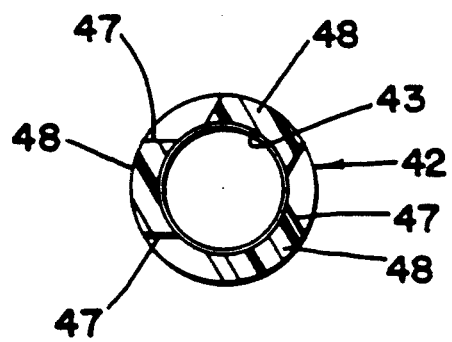
FIG. 17 is a sectional view of the outer sleeve taken on line 17—17 of FIG. 15, showing the fastener locking ribs, slots and serrations.

Surrounding and encompassing a major portion of the inner sleeve 25 is an outer sleeve or cylindrical body 42. Outer sleeve 42 has a central bore 43 that is serrated to frictionally receive the serrated outer surface of inner sleeve 25 as depicted by FIG. 2. Central bore 43 extends to the very end portion 44 of outer sleeve 42, which end portion 44 is closed as clearly shown by FIGS. 2 and 9. Outer sleeve 42 has a flanged head 45 at one end, opposite such other closed end portion 44. Outer sleeve 42 has a plurality of circumferentially spaced longitudinally extending slots 47 that extend from closely adjacent the flanged head 45 to the lower portion of such sleeve 42, which slots 47 register with the projections 36, 37 and 38, which prevent relative rotation between the inner sleeve 25 and the outer sleeve 42. Such slots 47 of the outer sleeve 42 cooperate with the projections 36, 37 and 38 of inner sleeve 25 to define rotary locking means that interconnects such sleeves. The material between the slots 47 form ribs designated 48 in FIG. 17. Outer sleeve 42 also has a plurality of circumferentially spaced recesses or sockets 50-51-52 (FIG. 16). A socket is defined as an opening, recess or hollow that forms a holder for something. In the instant structure such sockets 50-51-52 receive respectively the lower projections, lugs or locking lugs 29-30-31 to lock the inner sleeve 25 to the outer sleeve 42. Socket 50 extends completely through the wall thickness of the outer sleeve 42 and receives the full length of the lower projection or lug 29 (FIG. 2) forming a locking lug 29 in cooperation with the locking window or locking socket 50 to define axial locking means that prevent relative axial movement between the outer sleeve 42 and the inner sleeve 25. The entire blind fastener including the bolt 20, inner sleeve 25 and outer sleeve 42 is made or molded from plastic material, although the invention as disclosed can use other materials. FIG. 18A discloses the bolt 20 which can be cast or made in several ways or purchased as a staple item of commerce. The bolt 20 is then placed in a mold 55 which has an opening 56 into which the plastic material can be introduced into the mold 55. The mold has a central chamber 57 with a serrated inner surface 58 to mold the outer serrated surface on the inner sleeve 25. As seen in FIG. 18C, the inner sleeve 25 is formed complimentary to the contour of the central chamber 57 including the forming of the score or incision 40 on the inner sleeves 25 to facilitate the separation of the sleeve 25 into two separate portions designated as upper portion 25a and as lower portion 25b in FIG. 11. To further facilitate this separation process or tendency, the wall thickness of the upper portion 25a is thinner than the wall thickness of the lower portion 25b. The joined bolt 20 and the inner sleeve 25 is then placed in a mold 60 whose inner chamber 61 is complimentary to the formation and molding of the outer sleeve 42 with its slots 47, ribs 48 and sockets 50-51-52. Mold 61 has an opening 62 through which flowable plastic material is introduced into the mold and forms such outer sleeve 42. The newly formed blind fastener is removed from the mold 60 and is now ready for application to a workpiece for serving as a means for fastening an article to the workpiece.

FIG. 10 designates a thin flat sheet, or workpiece 62 which has a bore 63 suitably located therein. The blind fastener as depicted by FIGS. 2 and 3 is introduced into bore 63 such that the flanged head 45 is seated against the upper or accessible surface of the workpiece or thin plate as viewed in FIG. 10. The views as depicted by FIGS. 1 through 18 are on an enlarged scale as the cast blind fastener is a relatively small diameter blind fastener that can be less than a half inch (or 1.27 cm.) in diameter, however, nothing precludes these fasteners from being of larger diameter. The point being that these blind fasteners can be used on thin sheet metal workpieces and accomplish a fastening that does not interfere with the smooth outer surface of such workpieces. A draw rod or bolt 20 which is threadedly connected to the inner sleeve 25 is then moved upwardly relative to the flanged head 45 of outer sleeve 42 while a suitable anvil or other means maintains a downward pressure on flanged head 45 as illustrated by the arrow in FIG. 10 so that on continued upward movement of bolt 20 will cause a force transfer from the inner sleeve 25 to the outer sleeve 42 which will cause the ribs 48 to buckle forming a bulged portion 65 (FIGS. 10 and 11), which bulged portion 65 in cooperation with the flanged head 45 captively secure the blind fastener to the structure, workpiece or thin flat sheet 62. Such upward and downward direction as referred to above are directed to FIGS. 1 through 18E and the blind fastener can also be attached to an overhead plate member in which case the directions are reversed. Continued upward movement of bolt 20 will cause the upper portion of inner sleeve 25 to separate at the score line or incision 40 from the lower portion of the inner sleeve 25 as depicted by FIG. 11. The bolt 20 can then be screwed out of the upper portion of the inner sleeve 25 and can then be used to attach an item to the lower portion of the inner sleeve of the blind fastener. The variation in this process described, is that the bolt in the initial process of upsetting the outer sleeve 42 can be threaded into the bore 26 to a depth to fully engage the threads in the upper and lower portion of the inner sleeve 25 and that after fully upsetting the outer sleeve, bolt 20 can be rotated to where it only engages the threads 26 of the upper portion of the inner sleeve 25. Thereafter continued upward movement of bolt 20 will separate the upper portion of inner sleeve 25 from the lower portion of inner sleeve 25 as depicted by FIG. 11.

It will be apparent that, although a specific embodiment of the invention has been described in detail, the invention is not limited to the specifically illustrated and described construction since variations may be made without departing from the principles of the invention.

I claim:

1. The method of making a blind fastener consisting essentially of the steps of locating a threaded bolt with a longitudinally extending threaded shank and a flanged head into a first mold that has a cavity therein with such head protruding out of said mold, molding an inner longitudinally extending plastic sleeve with a lower end portion onto said threaded bolt in said first mold wherein the sleeve is interconnected to such bolt by the threads therebetween, said inner sleeve molded in said first mold to have two axially spaced projections that are radially outwardly extending, one of said projections molded in said first mold to the lower end portion of said inner sleeve, and molding an outer sleeve with a lower end portion onto said inner sleeve in a second mold while simultaneously molding at least a pair of axially spaced sockets into said outer sleeve, one of said sockets molded into the lower end portion of said outer sleeve to receive the projection on the lower end portion of said inner sleeve to lock said lower portions together, the other one of said sockets spaced axially from said one socket being an axially extending socket that receives the other one of said projections on said inner sleeve to permit relative movement between said sleeves other that said lower end portions.

2. A method according to claim 1 wherein the projections on said inner sleeve centers said bolt and inner sleeve within the second die.

3. A method according to claim 2 wherein the second die has axially extending projections in alignment with and abutting the other projection in the inner sleeve to form one of said sockets that is axially extending in the outer sleeve to facilitate axial movement of said inner sleeve relative to said outer sleeve while said lower end portions of said sleeves are locked at said lower end portions to facilitate upsetting of said outer sleeve.

4. A method according to claim 3 wherein said inner sleeve molded within the first die is molded with an upper wall portion that is thinner in cross section than the lower wall portions to provide the separation therebetween after formation of the upsetting of the outer sleeve.

5. The method of making a blind fastener as set forth in claim 1 wherein said molding of said outer sleeve is from a plastic material.

6. The method of making a blind fastener as set forth in claim 5 wherein said bolt is cast from plastic prior to the molding of said inner sleeve for threaded connection of said inner sleeve.

7. The method of making a blind fastener as set forth in claim 6 wherein said inner sleeve is formed into an upper portion and a lower portion with a circumferentially extending groove therebetween that facilitates separation therebetween upon fully upsetting of such outer sleeve.

8. The method of making a blind fastener as set froth in claim 7 wherein said inner and outer sleeves are formed with spaced flange heads at their uppermost portions and with the flange head of said inner sleeve abutting said flanged head on said bolt.

9. The method of making a blind fastener as set forth in claim 8 wherein said molding of said inner plastic sleeve provides a serrated outer wall surface thereto, and said molding of said outer plastic sleeve provides a serrated inner wall surface thereto for engagement with said serrated outer surface.

* * * * *